United States Patent [19]
Bolgár et al.

[11] Patent Number: 5,927,597
[45] Date of Patent: Jul. 27, 1999

[54] MIXER TAP BATTERY CARTRIDGE WITH THERMOSTATIC TEMPERATURE CONTROL

[75] Inventors: György Bolgár; Győző Vidor, both of Budapest, Hungary

[73] Assignee: Multipolar KFT., Hungary

[21] Appl. No.: 08/894,416

[22] PCT Filed: Feb. 22, 1996

[86] PCT No.: PCT/HU96/00009

§ 371 Date: Aug. 19, 1997

§ 102(e) Date: Aug. 19, 1997

[87] PCT Pub. No.: WO96/26475

PCT Pub. Date: Aug. 29, 1996

[30] Foreign Application Priority Data

Feb. 24, 1995 [HU] Hungary .............................. 95 00570

[51] Int. Cl.⁶ .................................................. G05D 23/13
[52] U.S. Cl. ..................................... 236/12.2; 137/625.17
[58] Field of Search ........................... 236/12.2; 137/607, 137/625.17, 637

[56] References Cited

U.S. PATENT DOCUMENTS

| | | | |
|---|---|---|---|
| 3,965,936 | 6/1976 | Lyon | 137/625.17 |
| 4,325,403 | 4/1982 | Uhlmann | 137/625.17 |
| 4,458,839 | 7/1984 | MacDonald | 236/12.16 |
| 4,887,642 | 12/1989 | Bernat | 137/625.17 |
| 4,942,902 | 7/1990 | Knapp | 137/625.17 |
| 5,535,943 | 7/1996 | Kahle et al. | 236/12.2 |

FOREIGN PATENT DOCUMENTS

| | | |
|---|---|---|
| 0242675 | 10/1987 | European Pat. Off. . |
| 0461536 | 12/1991 | European Pat. Off. . |
| 0605845 | 7/1994 | European Pat. Off. . |
| 3142079 | 5/1983 | Germany . |
| 3300600 | 7/1983 | Germany . |
| 3614735 | 11/1987 | Germany . |

*Primary Examiner*—William E. Tapolcai
*Attorney, Agent, or Firm*—Bachman & LaPointe, P.C.

[57] ABSTRACT

The invention concerns a mixer tap battery cartridge in which are fitted an inlet washer and control washer made from ceramic material, the control washer being provided with a hot water backflow chamber and a cold water backflow chamber, while the inlet washer has a hot water rising channel, hot water backflow channel, cold water rising channel, and cold water backflow channel. A cold water inlet channel is connected to the cold water rising channel, a cold water outlet channel is connected to the cold water backflow channel, a hot water inlet channel is connected to the hot water rising channel, and a hot water outlet channel is connected to the hot water backflow channel. The other end of the hot water outlet channel and of the cold water outlet channel are situated next to a control plunger which is connected, preferably mechanically, to a thermal expansion insert. A positioning element, preferably a lifting rod which extends into a control spindle, is situated next to one end of the thermal expansion insert, and a counterspring is advantageously provided at the other end of the lifting rod. The counterspring should also be inside the control spindle; the cold rising channel, cold water backflow channel, and hot water rising channel, as well as the hot water backflow channel, substantially a circular arc or similar shape at least in those parts in contact with the control washer, the latter being connected to a ceramic lever which is in direct or indirect drive contact with the positioning element, optionally via the adjusting spindle.

7 Claims, 4 Drawing Sheets

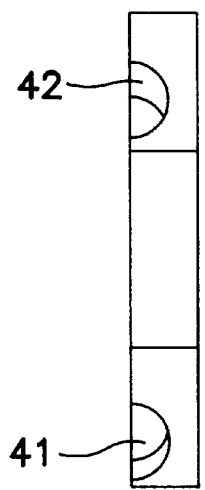
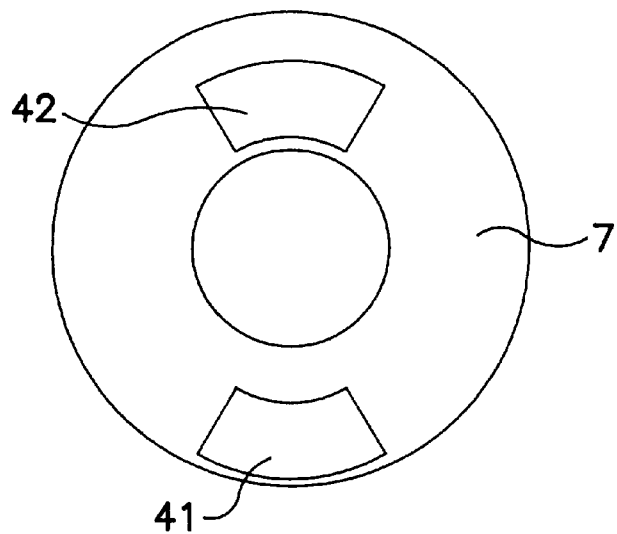
FIG. 2A    FIG. 2B
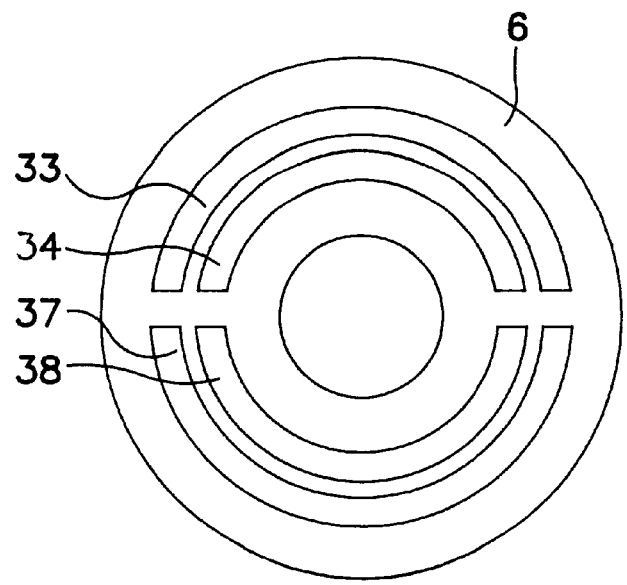
FIG. 3

MIXER TAP BATTERY CARTRIDGE WITH THERMOSTATIC TEMPERATURE CONTROL

BACKGROUND OF THE INVENTION

The object of the invention is a mixed water tap cartridge with thermostatic temperature regulation.

Mixed water taps which serve for the blending of cold and warm water, in which the inflow of the cold water, or of the warm water into the mixing area, is ensured by separate taps, have been known for a long time; these enable the creation of a suitable mixed water temperature between the inflowing cold-, or warm water.

The demand for increased user comfort, brought about the appearance of a mixed water tap which can be operated with a single handle; these appeared from the 1960's onwards with ceramic form-sealing.

These single-handle mixed water taps with ceramic form-sealing have, even after modification, improvement and partial renewal, remained principally identical in structure and function to the original. The relative movement of two ceramics of polished hard surface forming a plan-sealing between each other ensures, through moving only one handle, the regulation of the mixing ratio and flow-through ratio of the cold and warm water. Generally through a vertical movement the opening and closing and through a turning the thermostatic control is ensured. In the aforesaid ceramic disks suitable in- and outflow openings and mixing areas are formed.

This regulating-unit, which contains the two ceramic disks, moving-turning elements, as well as the upper operating-handle, onto which the taps only operating handle is fixed, is as a complete unit, called a cartridge.

Apart from these, other mixed water taps have appeared to meet primarily the needs of medical surgery, ensuring precise outflow water temperature regulation. They are called thermostatic mixed water tap batteries.

Within these water tap batteries two, independent operating elements have been arranged. With the one, the opening and closing of the mixed water flow is achieved. This is traditionally made of a rubber-sealing, or nowadays more commonly a ceramic plane-sealing valve. The other operating element serves the precise setting and regulation of the outflow water temperature.

The function of the latter is based on a precisely calibrated thermal expansion element. The expansion of the heat-expanding element moves a piston, which serves the regulation of the cold and warm water inflow. This piston and the expanding element mounted with it is pressed by the constant force of a spring to the end of a windingly-rising spindle. In the winding spindle a counter-pressure spring of greater force is installed, which in the case of the sudden movement of the temperature regulating spindle (in first line when the temperature turning-knob is set from warm to cold water) ensures that the very low-stroked piston cannot be stretched. The turning-knob can be mounted onto the finely parted ribs on the end of the temperature regulating spindle, into a position in which at the set water temperature (38–40° C.) the corresponding value of the temperature scale is aligned with the base signal.

The temperature scale is generally located on the turning-knob, while the base signal is situated on the housing of the mixed water tap, though it can also occur the other way around. The outflow water temperature of thermostatic mixed water taps remains constant with the value indicated by the temperature scale, independent of temperature, pressure and outflow quantity of the cold and warm water. The cost of a thermostatic mixed water tap battery is much higher than that of single-handle mixed water tap with ceramic disks. The most unfavorable feature of the single-handle mix water tap batteries is that the temperature of the outflow water, apart from the setting of the operating-handle, it is also dependent on the temperature, pressure of the warm and cold water and the set outflow water quantity. This is experienced when in a given angle the fully opened tap is suddenly closed. The outflow water temperature is altered and does not remain constant.

The well known thermostatic mixed water tap batteries also have a number of unfavorable features which cause them to be often defective. One of their greatest disadvantages is that the water outlet opening and closing does not occur through separate cold or rather warm water inlets, but after the thermostatic temperature regulation. As the regulating piston cannot completely close off the cold and warm water branches from each other, the cold and warm water drain systems are in a closed state in connection with each other, and so even the slightest difference in pressure could cause a cross flow between the two branches.

To prevent this from occuring, it is necessary to install a back-flow valve into such mixed water tap batteries at each cold and warm-water induct.

As in such back-flow valves the complete closure could be hindered by even the smallest particle of pollution, it is necessary to install fine sieves in front of the valves. A further disadvantage is the need for two separate and independent regulating units for the water quantity and temperature regulation, which require large, excessive expenditure of material and unconventionally constructed and shaped housings.

SUMMARY OF THE INVENTION

The aim of the present invention is the avoidance of the above mentioned unfavorable features and the simplification of the use and construction of thermostatic mixed water tap batteries, as well as increased reliability of these.

The task of the present invention is to create a battery cartridge, so that the temperature and quantity of the outflowing water can be advantageously set with the same operating element, preferably with a handle. The turning of the handle sets the temperature of the outlet water and the already known vertical movement allows for the setting of the outlet water quantity. According to the invention the task can be solved with a mixed water tap cartridge in which are placed, in an already known manner, an inlet disk and a regulating disk made of ceramic; formed in the regulating disk, also in an already known manner, is a cold and warm water back-flow chamber. In the inlet disk is a warm water upper-flow drain, as well as a warm water back-flow drain and a cold water upper-flow drain and a cold water back-flow drain. At the cold water upper-flow drain is a cold water inlet drain, and at the cold water back-flow drain is a cold water outlet drain. Further on, at the warm water upper-flow drain is a warm water inlet drain, and at the warm water back-flow drain a warm water outlet drain is connected. Whereas the other end of the warm water outlet drain and the cold water outlet drain are placed at a regulating piston, which stands in an appropriately mechanical connection with a thermal expansion pad. Next to the one end of this thermal expansion pad is one end of a positioning organ, which is advantageously placed at a lever which is reaching into a setting spindle, while at the other end of the lever is a counter-pressure spring placed also preferably into the setting spindle. Whereas the cold water upper-flow drain and the cold water back-flow drains, and the warm water upper-flow drain and the warm water back-flow drain in the inlet disk are at least at their parts which are touching the regulating disk basically circular-arch shaped or similar in construction. The regulating disk is directly or indirectly connected to a ceramic-moving handle, which stands directly or indirectly with the positioning organ, for example through the setting spindle, in a driving connection. According to the invention the above mentioned task can be solved with a mixed water tap cartridge in which around the thermal expansion pad is arranged a setting spring, which is leaning with its one end against the regulating piston, and with its other end against a locking screw.

Further on, the above mentioned task can be solved with a mixed water tap cartridge in which a fine-adjustment casing is placed within the setting spindle.

Further on, the above mentioned task can be solved with a mixed water tap cartridge in which the setting spindle is connected to the operating handle through the locking cap.

The task of the invention mentioned above can be solved by a mixed water tap cartridge, wherein the setting spindle is in driving-connection with the lever holding element.

BRIEF DESCRIPTION OF THE DRAWINGS

Construction and function of the invention will be explained in greater detail using the accompanying figures.

FIG. 2 shows the side and bottom views of the ceramic regulating disk of the mixed water tap cartridge, according to FIG. 1 in cross section.

FIG. 3 shows the top view of the ceramic inlet disk.

DETAILED DESCRIPTION OF PREFERRED EMBODIMENTS

Figures 1A, 1B:
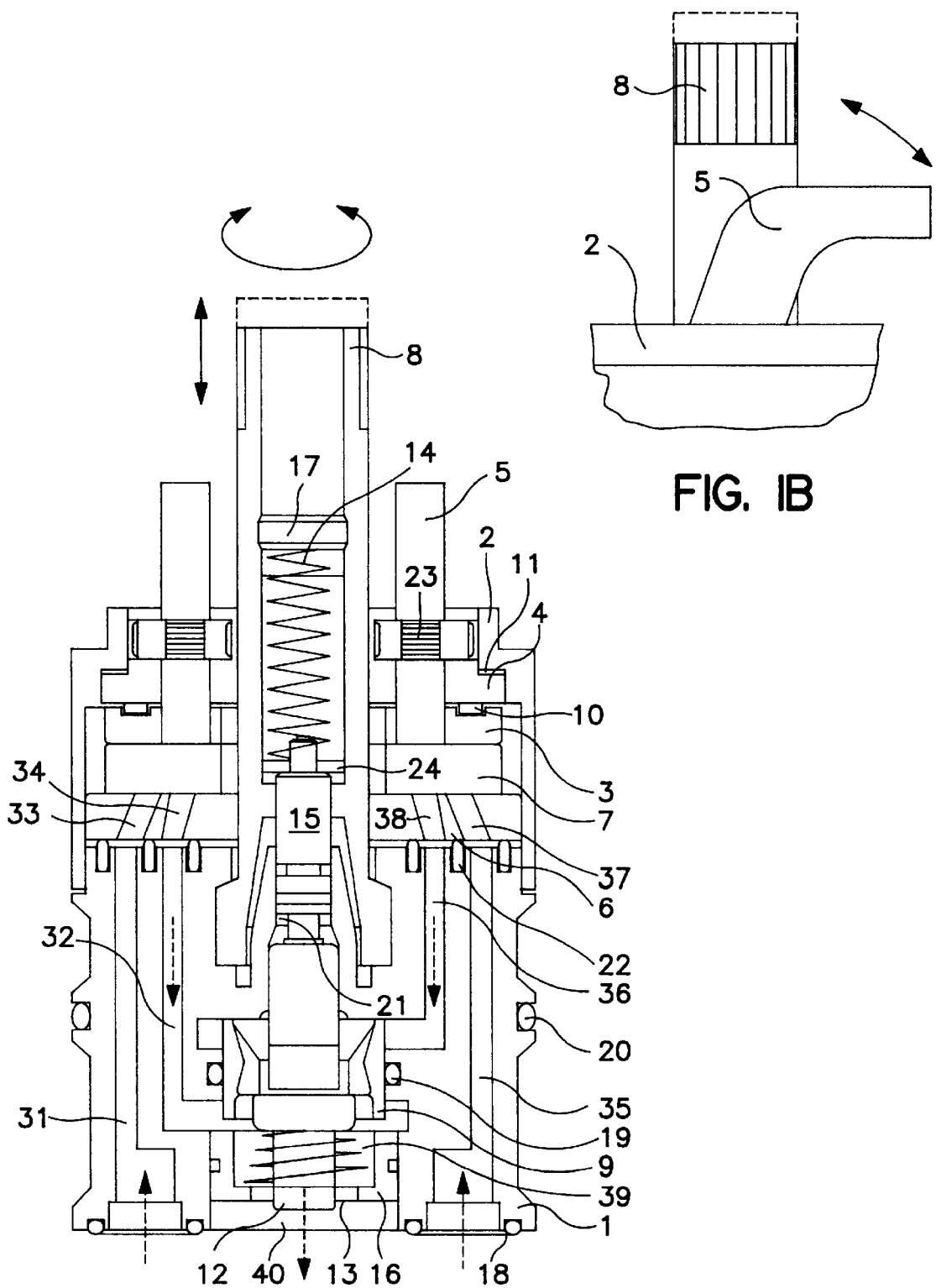
FIG. 1 shows a cross section of the thermostatic mixed water tap battery.

According to FIG. 1, the design of the invented mixed water tap cartridge is positioned in a housing 1 and closed off by a lid 2. The gliding plate 10 can be found between the lever holding element 4 and the ceramic-moving element 3.

The setting spindle 8 is bound in a winding fashion in the central shaft of the housing 1.

The lever 15 is situated in the setting spindle 8 and the concentric shaft of the housing 1 and is sealed off from the housing with a fourth washer 21.

The end of the setting spindle 8 opposite the housing 1 has a rippled formation. Further, on the inside of the setting spindle 8 is an If underlay 24 which is leaning against the lever 15 and a counter-pressure spring 14, which is situated between the underlay 24 and the spring-regulating screw 17. Positioned within the housing 1 is the warm water inlet drain 31, the warm water outlet drain 32, the cold water inlet drain 35, and the cold water outlet drain 36. Placed concentrically in the shaft of the housing 1 is the thermal expansion pad 12, which is in mechanical connection to the regulating piston 9.

At the end of the thermal expansion pad 12, opposite to the lever 15, the setting spring 13 is positioned, supported by a locking screw 16.

The regulating piston 9 is sealed off from the housing 1 with a second washer 19. The outside of the housing is sealed with a third washer 20. An inlet disk 6 is situated at the end of the housing 1 opposite the locking screw 16 and the mixed water outlet 40. Contained within, is a warm water upper-flow drain 33 adjusted to the warm water inlet drain 31. Adjusted to the warm water outlet drain 32 is the warm water back-flow drain 34. Adjusted to the cold water outlet drain 36 is the cold water back-flow drain 38 and at the cold water inlet drain 35 the cold water upper-flow drain 37 is fixed. A form-sealing 22 is positioned between the inlet disk 6 and the housing 1.

At the end of the inlet disk 6 opposite to the housing 1 is a regulating disk 7, and situated above this is a ceramic-moving element 3. Above the ceramic-moving element 3, a gliding plate 10 can be found and situated above this is a lever-holding element 4 in which is contained on pins 23 the ceramic-moving handle 7.

In FIG. 2 the bottom and side views of the regulating disk 7 in cross section are shown. According to the illustration a warm water back-flow chamber 41 and a cold water back-flow chamber 42 are formed within the regulating disk 7.

FIG. 3 shows the view of the inlet disk 6 from above. Contained within this is a warm water upper-flow drain 33, a warm water back-flow drain 34, a cold water upper-flow drain 37 and a cold water back-flow drain 38.

Figure 4:
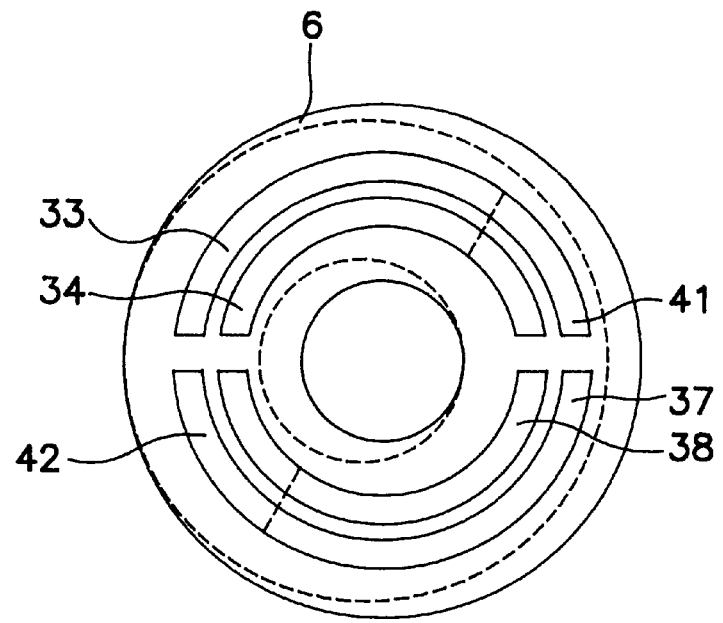
FIGS. 4 and 5 illustrate the relative positionings of the two ceramic disks in different angles.
Figure 5:
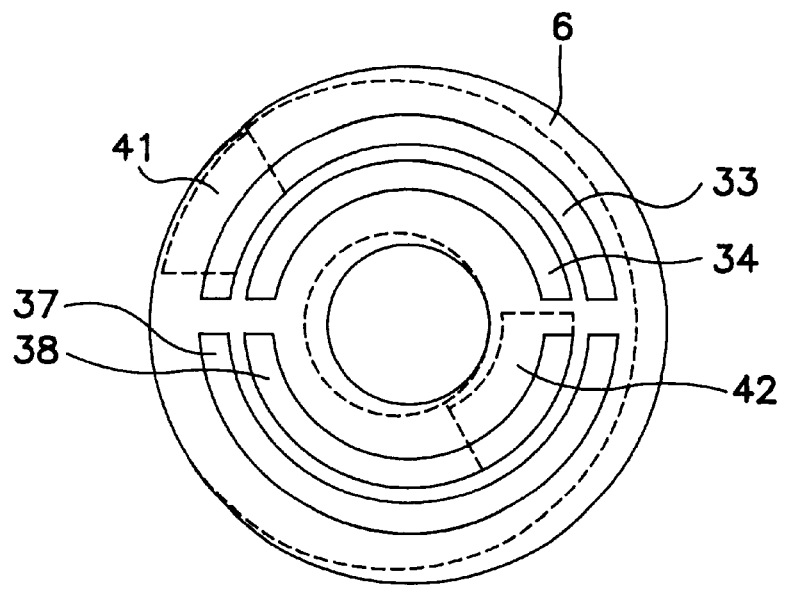

Different relative positionings of the inlet disk 6 and the regulating disk 7 can be seen in FIGS. 4 and 5.

Figure 6:
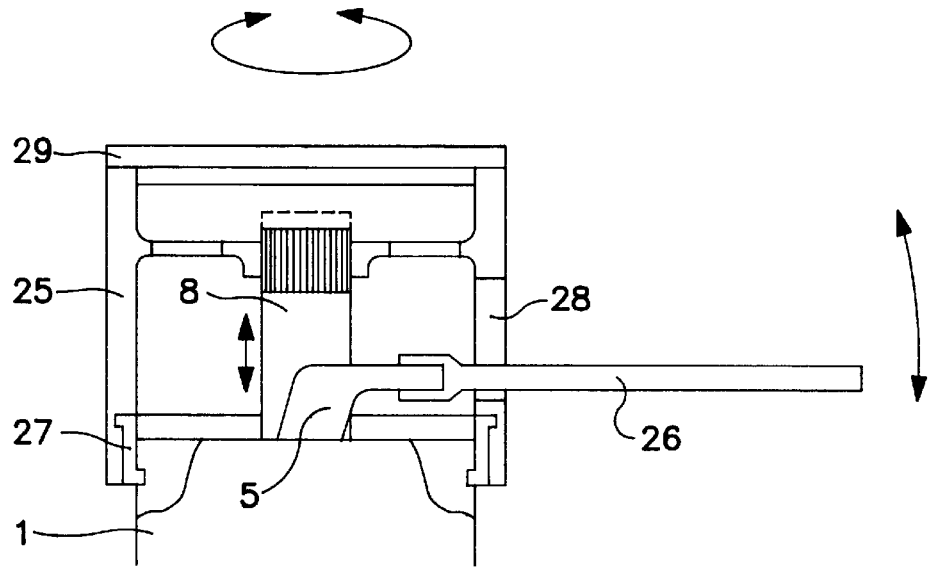
FIG. 6 shows a connection possibility between the operating handle and the setting spindle of the mixed water tap cartridge.

FIG. 6 shows one of the mechanical connection possibilities between the ceramic-moving element 5 and the setting spindle 8. According to FIG. 6 the ceramic moving handle 5 and the setting spindle 8 are connected through an operating handle 26 and a locking cap 25, which is connected to housing 1 with a double edged ring 27, whereas the operating handle 26 is in the carrier slot 28 of the locking cap 25. The locking cap 25 is closed off with a closing lid 29.

Figure 7:
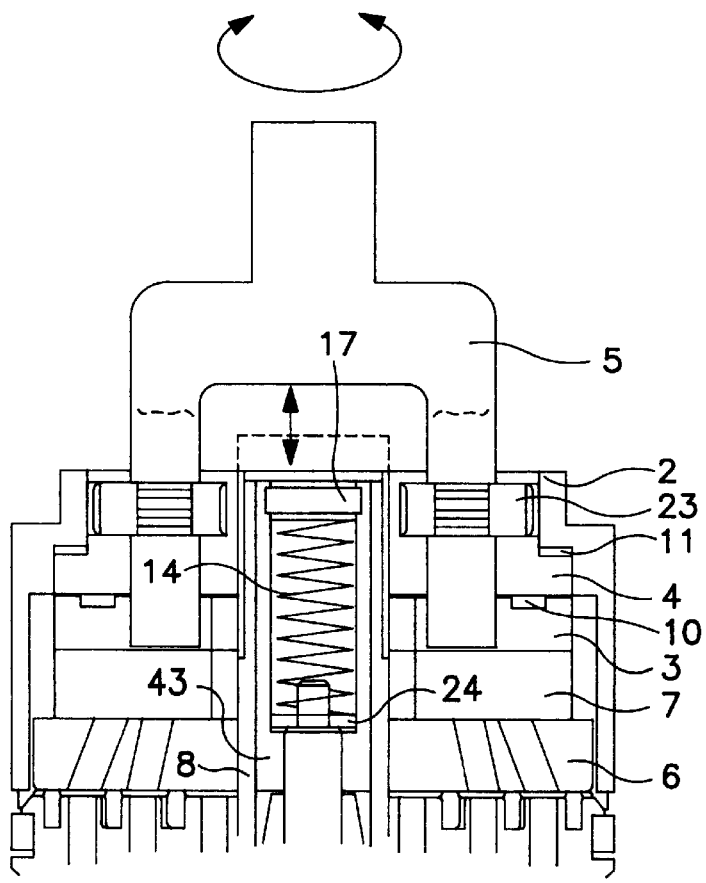
FIG. 7 illustrates a different mechanical connection possibility of the mixed water tap cartridge in cross section, as one of the design forms with a fine-adjustment casing.

According to FIG. 7, the temperature regulating mixed water tap cartridge differs in design from that of FIG. 1 in as far as that the setting spindle 8 is connected to the lever-holding element 4 in the turn-direction through a ribbed-shaped formation located at the end of the setting spindle 8. The locking-cap 25, which can be seen in FIG. 6, is therefore not necessary to safeguard the carrier-connection between the setting spindle 8 and the caramic-moving handle 5. Further there is a fine-adjustment casing 43 in the setting spindle 8.

Function of the mixed water tap cartridge illustrated in FIGS. 1–7 will be explained in greater detail in the following paragraphs. According to the design of the mixed water tap shown in FIG. 1 the warm water reaches the warm water upper-flow drain 33 through the warm water inlet drain 31 of the inlet disk 6. From here the water reaches first of all the warm water black-flow drain 34 through the, in FIG. 1 not visible, warm water back-flow chamber 41, quantity being dependent on the relative positions of the inlet disk 6 and the regulating disk 7 at the time. From there it reaches through the warm water outlet drain 32 and the bottom part of the regulating piston 9, which is in mechanical connection to the thermal expansion pad 12.

The cold water reaches the upper part of the regulating piston 9 through the cold water inlet drain 35, then through the cold water upper-flow drain 37, through the, in FIG. 1 not visible, cold water back-flow chamber 42, then through the cold water back-flow drain 38 and the cold water outlet drain 36.

The regulating disk 7 can be along the inlet disk 6 with the ceramic moving handle 5, which is held in the lever holding element 4, on one hand shifted perpendicular to the axis of rotation, while on the other hand turned as be seen on FIG. 4–5.

The shifting, perpendicular to the axis of rotation, ensures that in any position within the angle-range of rotation for the flow-through of the cold and of the warm water, however altering in function of the length of the horizontal shifting, the same cross-section should be. There the lower and upper end of the regulating piston 9 should be fed through an equal cross-section warm- and cold water inflow.

Considering the fact, that the flow-through cross-section for the inlet of the warm water and of the cold water available between the inlet disk 6 and the regulating disk 7 at any rotation of the ceramic moving handle 5 depends only on the vertical position of the ceramic moving handle 5, the rotation (turning) of the ceramic moving handle 5 can be used for setting of the temperature regulation as disclosed below.

The setting spindle 8, which is connected to the ceramic moving handle 5 or at other embodiments to other elements, which are further coupled to the ceramic moving handle 5, determines the position of the lever 15 through the underlay 24 biased through counter-pressure spring 14. At the other end of the lever 15 the thermal expansion pad 12 is arranged, which is coupled to the regulating piston 9, and the other end of the thermal expansion pad is placed in the mixed water outlet 40. The temperature of the water appearing in the mixed water outlet 40 can be set, of course only between the temperatures of the infed warm and cold water, through the position of the regulating piston 9 coupled to the setting spindle 8.

In a resting position the regulating piston 9 and the connected thermal expansion pad 12 is pressed upward with the setting spring 13 so that the regulating piston 9 closes the cold water outlet 36 off, eventhough the inflow of the cold and warm water through the regulating disk 7 with the lifting of the ceramic-moving handle 5 is set free. Only warm water reaches the mixing area 39 through the warm water outlet drain 32, until the temperature of the regulating piston set by the turning of the setting spindle 8 has been reached by the outflow water temperature.

At this temperature the thermal expansion pad 12 because of its expansion is leaned against the end of the lever 15, and because the pressure of the counter pressure spring 14, greatly exceeds the pressure of the setting spring 13 the regulating piston 9 moves and this on one hand opens the cold water outlet drain, and on the other hand slightly closes the warm water outlet drain 36 until the temperature of the outlet water flowing in the mixing area 39, and in the mixed water outlet 40 reaches the set temperature.

According to FIG. 6, the lifting of the ceramic-moving handle 5, more specifically the operating handle 26 -hooked up with it, can change the cold and warm water streams to the same extent with the vertical movement of the regulating disk 7. By the setting of the desired angle of the ceramic-moving handle 5 or the operating handle 26, the water inflow stream of the two different temperature waters remains the same. The mixed water temperature is therefore exclusively determined by the moving of the ceramic-moving handle 5, or more specifically, the angle of the setting spindle 8 set with the operating handle 26, or rather the thereby determined position of the lever 15.

The underlay 24, which is positioned in the setting spindle 8, as well as the spring-regulating screw 17 and the counter-pressure spring 14 stretched in between, ensure that the temperature to be set can be altered downward without any difficulty. For this the setting spindle 8, or rather the lever 15 is moved downward, which in the case of a stiff connection could cause an upper swing of the regulating piston 9 onto the locking-screw 12, and thereby cause blockage or damage. However, due to the upper swing occuring in the lower part of the regulating piston 9, if the setting spindle 8 were further turned, damage to the construction is avoided by the lever lifting up the underlay 24 which lies opposite the counter-pressure spring 24.

According to the design in FIG. 7, the construction can be simplified by the setting spindle 8 standing in direct carrier-connection in the turn direction to the lever-holding element 4. Apart from this, there is also a fine-adjustment casing with winded binding built into the setting spindle 8. The application of this simplifies the optimal calibration of the temperature regulating cartridge, while through the given turn-angle of the setting spindle 8, the turning of the fine-adjustment casing enables the precise of the outflow water temperature.

The advantage of the invented mixed water tap cartridge is that both the traditional ceramic cartridge and the thermostatic temperature regulating unit is concentrated within the one complete unit. This makes possible the general extension of the application of the thermostatic temperature regulation and safeguards the thermostatic temperature regulation within the circle of single-handle mixed water taps. The distinguishing advantage of the equipment, compared to the original ceramic cartridges is that the water quantity-regulation and the opening and closing occur before the thermostatic temperature regulation. The warm and cold water opening and closing occurs with the aid-slot regulation, of two specially developed ceramic disks, making back-flow valves unnecessary. The thermostatic temperature regulation in the water flow direction, occurs after the ceramic disks which serve for the opening and closing, from here the water enters immediately into the mixed water outlet.

We claim:

1. Mixed water tap cartridge which comprises:
    an inlet disk and a regulating disk both made of ceramic; a cold and a warm water back-flow chamber both formed in the regulating disk; a warm water upper-flow drain and a warm water back-flow drain, a cold water upper-flow drain and a cold water back-flow drain, all in the inlet disk; a cold water inlet drain adjacent the cold water upper-flow drain; a cold water-outlet drain adjacent the cold water back-flow drain; a warm water inlet drain adjacent the warm water upper-flow drain; and a warm water outlet drain adjacent the warm water back-flow drain; a regulating piston; opposite ends of said regulating piston being placed adjacent an end of the warm water outlet drain and the cold water outlet drain, said regulating piston being in mechanical connection with a thermal expansion pad; adjacent an end of the thermal expansion pad is one end of a positioning organ, which comprises a setting spindle and a lever which extends into said setting spindle; the cold water upper-flow drain and the cold water back-flow drain and the warm water upper-flow drain and the warm water back-flow drain in the disk being at least at their parts which are touching the regulating disk circular arch-shaped; and the regulating disk being connected to a ceramic-moving handle which stands in driving relationship with the positioning organ.

2. Mixed water tap cartridge according to claim 1, wherein the ceramic moving handle is in driving relationship with the setting spindle.

3. Mixed water tap cartridge according to claim 1, wherein at an opposed end of the lever is a counter-pressure spring placed into the setting spindle.

4. Mixed water tap cartridge according to claim 1, wherein around the thermal expansion pad is arranged a setting spring which contacts the regulating piston at one end and a locking screw at a second end.

5. Mixed water tap cartridge according to claim 1, including a fine-adjustment casing within the setting spindle.

6. Mixed water tap cartridge according to claim 1, wherein the setting spindle is connected to the handle through a locking cap.

7. Mixed water tap cartridge according to claim 1, including a driving connection between the setting spindle and a lever holding element.

* * * * *